No. 887,310. PATENTED MAY 12, 1908.
C. E. CHAMBERLIN.
CUTTING OFF TOOL AND HOLDER.
APPLICATION FILED DEC. 18, 1905.
2 SHEETS—SHEET 2.
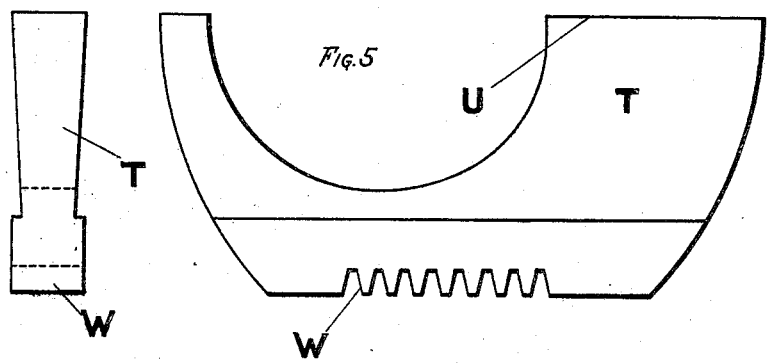
INVENTOR
Charles E. Chamberlin

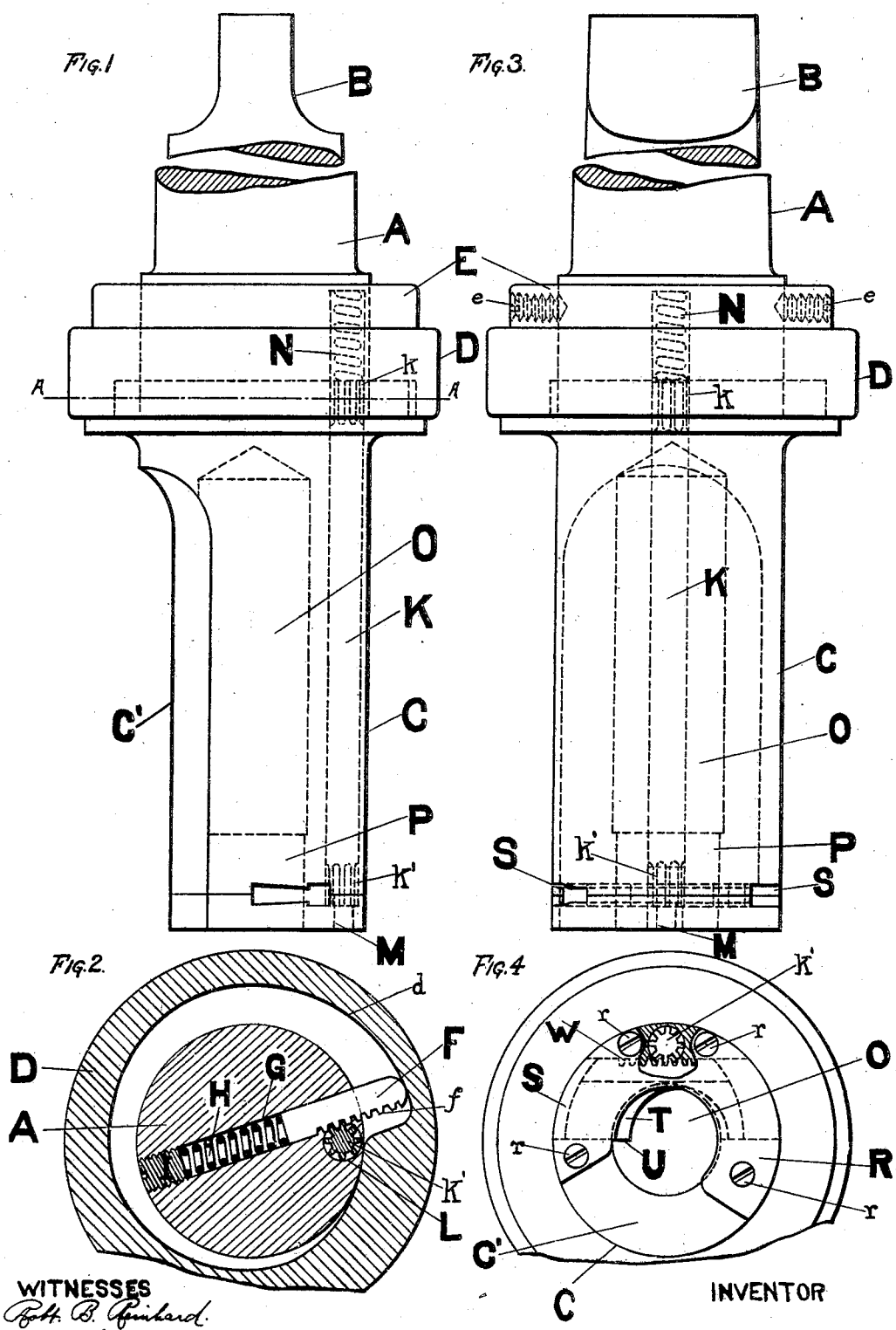

UNITED STATES PATENT OFFICE.

CHARLES E. CHAMBERLIN, OF BETHLEHEM, PENNSYLVANIA, ASSIGNOR OF ONE-SIXTH TO EMIL A. GATHMANN, OF BETHLEHEM, PENNSYLVANIA.

CUTTING-OFF TOOL AND HOLDER.

No. 887,310.      Specification of Letters Patent.      Patented May 12, 1908.

Application filed December 18, 1905. Serial No. 292,282.

*To all whom it may concern:*

Be it known that I, CHARLES E. CHAMBERLIN, a citizen of the United States, residing at No. 516 Goepp street, Bethlehem, in the county of Northampton and State of Pennsylvania, have invented a new and useful Cutting-Off Tool and Holder, of which the following is a specification.

My invention relates to cutting off tools for that form of material where a direct cut cannot be readily made by usual type of cutting off tools. Such forms of material are most frequently found in making and preparing physical test bars or rods from forgings or castings. A hollow drill or reamer is usually used in forming the bar or rod in material from which test specimen is to be taken. When the bar has been thus shaped in the material to be tested it is, however, still integral with said material, being connected to the same at the bottom of annular cut made by hollow drill or reamer.

The usual method of separating or cutting off the test bar has heretofore been to drill into the material at approximately right angles to the longer axis of said bar. This is a wasteful operation, consuming unnecessary material in specimen from which test is taken, and adding to the expense of such test.

By my invention I am enabled to cut off a rod or bar formed in the material as previously stated, with a minimum loss and deformation of material from which bar is cut. I attain these objects by the mechanism illustrated in the accompanying drawings, in which—

Figure 1 is a plan view of assembled holder and cutter. Fig. 2 is a cross-section on lines A—A of Fig. 1 with parts cut away for convenience of illustration. Fig. 3 is another plan view of assembled holder and cutter. Fig. 4 is a view of end of cutter with parts cut away for convenience of illustration. Fig. 5 is a plan view of blade of cutter. Fig. 6 is an end view of Fig. 5. Fig. 7 is a plan view of feeding cam. Fig. 8 is a side view of Fig. 7. Fig. 9 is a plan view of feed shaft with parts broken away for convenience of illustration. Fig. 10 is an end view of Fig. 9 showing pinion. Fig. 11 is a plan view of feed bolt. Fig. 12 is an end view of Fig. 11. Fig. 13 is a plan view of blade guide plate. Fig. 14 is an end view of Fig. 13.

Similar letters refer to similar parts throughout the several views.

The body of holder A is preferably fitted with the usual form of shank B. The forward part C of body A is made of a diameter corresponding to the outside diameter of the hollow drill or reamer used in shaping bar.

The feed setting ring D has a cylindrical bearing portion $d'$ snugly fitted over the stock A; this ring is held on the stock by set screws $e$. Within the feed ring D is formed a cam $d$, which bears against the feed bolt F fitted with rack $f$.

The feed bolt F is located in a chamber G within stock A, containing a spring H by which the bolt is kept in engagement with cam surface $d$, a plug I closing one end of said chamber G. A feed shaft K, fitted with pinions $k$ and $k'$, is located in guide bearings L and transfers the feed motion imparted to rack $f$ to the cutting blade T, which is provided with a rack W engaging the pinion $k'$. The cutting edge of blade is designated at U. A blade guide plate R, containing a recess S, is secured to the forward part of C by means of screws $r$. A small hole M in said guide plate R is in alinement with the feed shaft K, thereby allowing the pinion $k'$ to be moved clear of the rack W when a new cutting blade is to be inserted or old one removed, a spring N normally keeping said pinion $k'$ in the engaged position with cutting blade rack W. The forward part C of the body of holder A is provided with a recess O of slightly larger diameter than the body of the bar or rod it is desired to cut off. The recess O is decreased in diameter at P where the diameter should be such as to just easily fit the bar entering the said recess. A segment $C'$ of the forward part C of body A is preferably cut away so as to open up the recess O radially and thereby allow of ready removal of chips caused by the cutting off of the rod or bar by action of the blade T.

The use and operation of tool is as follows: A bar or rod having been formed in any material by means of a hollow drill, reamer or the like, the feed ring D of the tool is turned until the cutting blade T is housed within and clear of the recess O. The part C of the tool is then entered into the annular hole formed by the hollow drill or reamer, the bar or rod it is desired to cut off entering the recess O. When the tool has been entered to a depth at which the bar is to be cut off the tool is rotated about its greater axis in a direction so that the edge U of the blade T will cut into the bar or rod, when feed is given to same by turning the ring D. The feed is continued by moving of the said ring D until cutting blade T has been moved through about a semi-diameter of the rod or bar being cut off. The amount of movement of ring D to encompass the cutting off of bar can be determined by markings on its surface with reference to stock A, or can be gaged by listening for the sound of snap as bolt F reenters the high point of cam $d$. The rotation of tool on its longer axis and consequent cutting force of blade T can obviously be obtained in many manners; such as, for instance, fastening the shank B of holder in a drill press or lathe chuck. The cutting off tool can be embodied as a single tool in combination with a hollow drill or reamer, if desired, but I prefer the simplicity of construction obtained in a special cutting off tool as described. Many variations of tool can obviously be made without departing from the spirit of my invention.

Having thus described my invention, what I claim as new and desire to protect by Letters Patent is:

1. A cutting tool consisting of a stock provided with an axial recess and a detachable plate having a guide way for a cutter at the end of said stock in combination with a cutter extending across and adapted to be moved over the axial recess of said stock.

2. A cutting tool of the character described provided with a cutter blade of approximately segmental shape, said blade having a rack on its minor face and an approximately semi-circular recess on its opposite face, the cutting edge of blade being formed by the junction of aforesaid recess with the latter face substantially as shown and described.

3. In a cutting tool a stock provided with an axial recess, a cutter adapted to be moved across said recess, and means for guiding said cutter in its movement, said means consisting of a recessed guide plate removably attached to the recessed end face of the hollow stock.

4. In a cutting tool a stock provided with an axial recess, a cutter adapted to be moved across said recess, and means for guiding said cutter in its movement, said means consisting of a guide plate removably attached to the recessed end face of the hollow stock.

5. In a cutting tool a stock or holder provided with a shank at one end and an axial recess at the other end, and a cutter movable transversely of the recess located at or near this latter end, said cutter having a rack and means for moving said cutter, comprising a pinion engaging the rack of the cutter, a transversely movable rack engaging the pinion and a cam sleeve arranged to engage one end of said rack.

6. A cutter of approximately segmental shape provided with a rack on one face, and an approximately semi-circular recess on opposite face, the cutting edge of cutter being located at the junction of aforesaid recess with the latter face, substantially as shown and described.

CHARLES E. CHAMBERLIN.

Witnesses:
ROBT. B. REINHARD,
EMIL A. GATHMANN.